United States Patent [19]

Yukino

[11] Patent Number: 4,718,007
[45] Date of Patent: Jan. 5, 1988

[54] POWER CONTROL METHOD AND APPARATUS FOR DATA PROCESSING SYSTEMS

[75] Inventor: Eichi Yukino, Hadano, Japan
[73] Assignee: Hitachi, Ltd., Tokyo, Japan
[21] Appl. No.: 745,232
[22] Filed: Jun. 17, 1985

[30] Foreign Application Priority Data

Jun. 19, 1984 [JP] Japan .................... 59-125683

[51] Int. Cl.⁴ ............................... G06F 7/02
[52] U.S. Cl. ........................ 364/200; 371/66
[58] Field of Search ... 364/200 MS File, 900 MS File; 371/66

[56] References Cited

U.S. PATENT DOCUMENTS

| | | | |
|---|---|---|---|
| 4,293,927 | 10/1981 | Hoshii | 364/900 |
| 4,307,455 | 12/1981 | Juhasz et al. | 364/900 |
| 4,412,284 | 10/1983 | Kerforne et al. | 364/200 |
| 4,419,917 | 12/1983 | Sato | 84/1.01 |
| 4,573,117 | 2/1986 | Boney | 364/200 |
| 4,615,005 | 9/1986 | Maejima et al. | 364/200 |

Primary Examiner—Raulfe B. Zache
Assistant Examiner—Emily Y. Chan
Attorney, Agent, or Firm—Antonelli, Terry & Wands

[57] ABSTRACT

In a power control method and apparatus for a data processing system, a judgement is made as to whether or not a power supply of the system is to be turned OFF on the basis of the temporal relationship between a present time and a power ON reservation time in response to the end of a predetermined job stream. If the present time is before the power ON reservation time, the power supply is turned OFF.

15 Claims, 3 Drawing Figures

POWER CONTROL METHOD AND APPARATUS FOR DATA PROCESSING SYSTEMS

BACKGROUND OF THE INVENTION

The present invention relates to an automatic power control method and apparatus for data processing systems which carries out data processing according to a program stored in a memory.

It is assumed that in view of the rising cost of labor that the automatic operation of data processing systems will increase. In particular, the automation of power ON/OFF control lessens the necessity for operators to go to work early in the morning and to work till late at night, which fact reduces labor costs and improves labor conditions. The automatic power ON/OFF control is therefore regarded as having a principal role in the automatic operation of data processing systems.

Hitherto, the ON/OFF control of the power supply for a data processing system has generally been effected in the following manner. The power supply is automatically turned ON by an automatic power ON/OFF control unit on the basis of the power ON reservation time which has already been set and is automatically turned OFF by the power ON/OFF control unit in response to a power OFF instruction which is given to the unit by a program when a condition which has been specified is satisfied, for example, when a predetermined job stream is ended, or when a predetermined time is reached.

As described above, in the conventional automatic power ON/OFF control method, the relationship between the present time and the power ON reservation time is not taken into consideration at the time when the power supply is turned OFF. For this reason, the conventional method involves the following disadvantages. Namely, in the case where the present time at which the power OFF condition is satisfied is subsequent to the power ON reservation time schedule for the next power ON operation, the power supply of the system is undesirably turned OFF when in fact that, at that time, the power supply should be turned ON by the power ON/OFF control unit. Further, if the data processing system is such that it is repeatedly used in a manner causing the power supply to be turned ON immediately after the power supply has been turned OFF, and since the power ON reservation time is reached immediately after the power OFF operation, the reliability of hardware of the system is adversely affected. Furthermore, even in the case where the power supply is turned OFF because of occurrence of a serious hardware fault which makes it impossible to carry on the system operation, when the power ON reservation time is reached, the power supply of the system is undesirably turned ON again by the automatic power ON/OFF control unit, which fact may make the trouble worse.

SUMMARY OF THE INVENTION

Accordingly, it is a primary object of the present invention to provide an automatic power control method and apparatus which enables appropriate operation of a data processing system.

To this end, according to the invention, a judgement or a determination is made as to whether or not the power supply is to be turned OFF based upon the temporal relationship between the present time and the scheduled power ON reservation time in response to the end of a predetermined job stream. If the present time comes before the power ON reservation time, the power supply is turned OFF.

DESCRIPTION OF THE PREFERRED EMBODIMENTS

One embodiment of the present invention will be described hereinunder with reference to the accompanying drawings.

Figure 1:
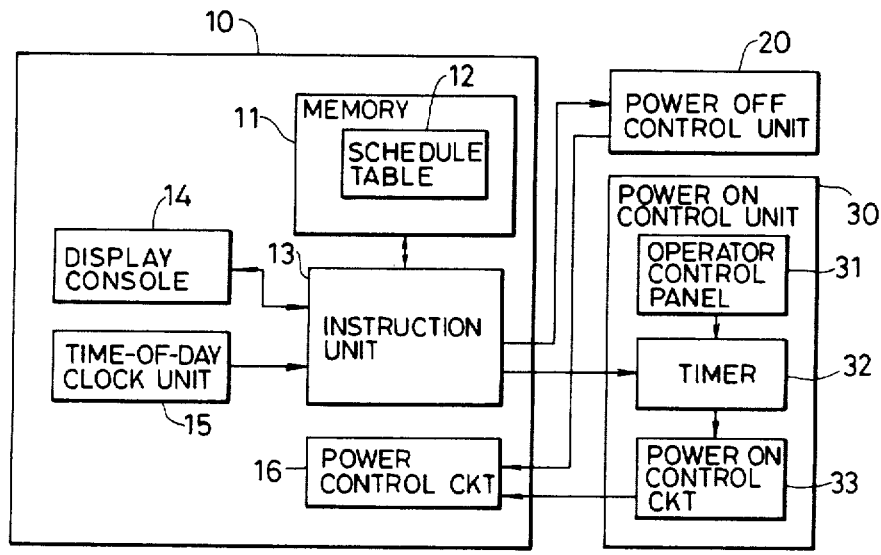
FIG. 1 is a block diagram of one embodiment of the present invention.

FIG. 1 is a block diagram of one embodiment of the present invention. In the Figure, the reference numeral 10 denotes a data processing system (referred to simply as a "system", hereinafter), the numeral 20 a power OFF control unit for the system 10, and the numeral 30 a power ON control unit for the system 10.

The system 10 includes a memory 11 and an instruction unit 13. The system 10 reads out and inputs instructions to the instruction unit 13 according to various programs stored in the memory 11, thereby carrying out data processing.

When the program issues a power OFF instruction, the instruction unit 13 commands the power OFF control unit 20 to turn OFF the system power supply. The system 10 further includes a display console 14, a time-of-day clock unit 15 which represents the present time, and a power control circuit (e.g., a switch) 16 which turns OFF/ON the power supply of the system 10 in accordance with the control effected by the power OFF control unit 20 or the power ON control unit 30. The system 10 may further include units or devices required for data processing. They are, however, not directly related to the present invention and, therefore, description thereof is omitted. The memory 11 has stored therein a schedule table 12 on which a power ON reservation time has been registered. This schedule table 12 may be registered in a register or similar means which is additionally provided rather than in the memory 11. It is assumed that the registration of the power ON reservation time is effected from the display console 14.

The power OFF control unit 20 actuates the power control circuit 16 according to commands from the instruction unit 13 such as to turn OFF the power supply of the system 10.

The power ON control unit 30 includes an operator control panel 31, a timer 32 and a power ON control circuit 33. A power ON reservation time for the power supply of the system 10 is set on the timer 32 from the operator control panel 31, whereby, when the power ON reservation time is reached, the timer 32 instructs the power ON control circuit 33 to actuate the power control circuit 16 such as to turn ON the power supply of the system 10.

Although in this embodiment the registration of the power ON reservation time on the schedule table 12 and the setting of the reservation time on the timer 32 are independently effected from the display console 14 and the operator control panel 31, respectively, the arrangement may be such that it is possible for the power ON reservation time to be simultaneously set on the schedule table 12 and the timer 32 from the display console 14 or the operator control panel 31. Moreover, the arrangement may be such that the software itself sets the power ON reservation time by making a judgement or determination from the job processing condition. To set the time on the table 12 and the timer 32, it is possible to properly adopt various techniques in addition to those described above.

Further, although in the above-described embodiment the system 10, the power OFF control unit 20 and the power ON control unit 30 are described as being independently provided units, such is not a requirement and they may alternatively be incorporated into the data processing system 10 itself.

Figure 2:
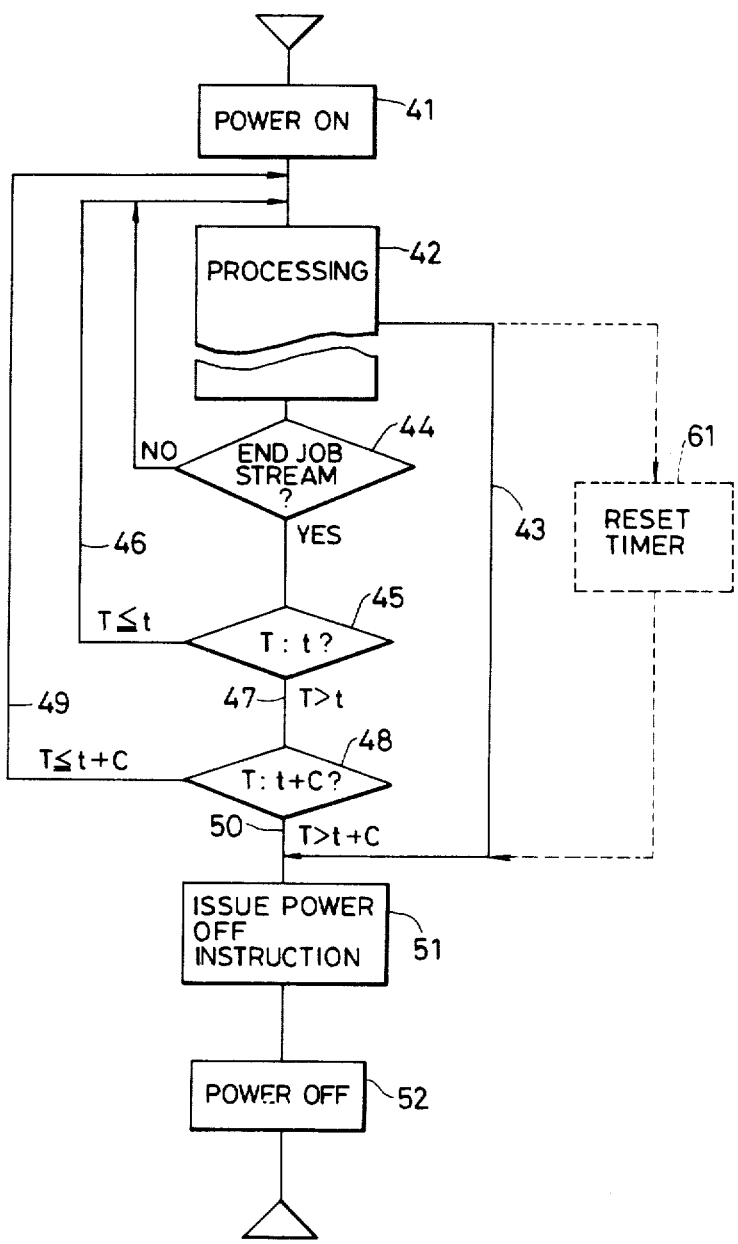
FIG. 2 is a flow chart for explaining the automatic power ON/OFF operation.

FIG. 2 is a flow chart which shows one example of the operation of the automatic power control apparatus shown in FIG. 1. It is assumed that the power ON reservation time T for the power supply of the system 10 has been set on both the timer 32 and the schedule table 12, and the control process has been programmed such that a power OFF instruction is issued when a predetermined job stream has been ended. When the timer 32 reaches the power ON reservation time T, the power ON control unit 30 turns ON the power supply of the system 10 (step 41), and processing for the particular day is started (step 42). A judgement or a determination is made in a step 44 as to whether or not the job stream for the day has been ended. In the case where processing is interrupted by the occurrence of a fault which makes it impossible to carry on the operation of the system 10 during the running of the same, the control process branches to a branch 43, and a power OFF instruction is issued to the power OFF control unit 20 (step 51), whereby the power supply of the system 10 is turned OFF (step 52). In this case, comparison between the present time t and the power ON reservation time T is not made. When the job stream has been ended, the program reads out the present time t from the time-of-day clock unit 15 and compares the present time t with the power ON reservation time T stored in the schedule table 12 (step 45). If the result of the comparison shows that the present time t is is later or subsequent to the power ON reservation time T (if the present time t comes after the power ON reservation time T), this fact shows that it is the time at which the power supply should originally be turned ON by the power ON control unit 30. The process therefore branches to a branch 46, and the processing for the next day is executed (step 42) and in such a case no power OFF instruction is issued. More specifically, the power supply is prevented from being turned OFF during the period of the time when the power supply should originally be ON. If the comparison made in step 45 shows that the present time t is prior to the power ON reservation time T (if the present time t comes before the power ON reservation time T), the control process branches to a branch 47. Then, a comparison is made between the power ON reservation time T and the time (t+c) which is obtained by adding a predetermined positive time c to the present time t (step 48). If the result of the comparison shows that the time (t+c) is larger than the power ON reservation time T, the process branches to a branch 49, and the processing for the next day is executed (step 42). The above-described positive time c is set such as to be any desired value which does not lead to a successive ON/OFF control operation wherein the power supply is turned ON immediately after it has been turned OFF, which exerts adverse effects on the reliability of the hardware. Accordingly, no power OFF instruction is issued in the case where the period of time from the end of the job stream to the power ON reservation time for the next processing is within the period of time c. It is therefore possible to avoid a power control such that the power supply is turned ON before the time c elapses after the power supply has been turned OFF, which adversely affects the reliability of the hardware. Further, employment of the above-described technique makes it possible to prevent any uncontrollable status of the power ON/OFF control which may occur when the job stream end time and the next power ON reservation time T are very close to each other.

If the result of the comparison made in the step 48 shows that the time (t+c) is smaller than the power ON reservation time T, the control process branches to a branch 50, and the power OFF instruction is issued to the power OFF control unit 20 (step 51), whereby the power supply of the system 10 is turned OFF (step 52). Thereafter, when the power ON reservation time T is reached, the power ON control unit 30 turns ON the power supply of the system 10 (step 41).

As has been described above, in this embodiment, the program itself manages the power ON reservation time for turning ON the power supply of the system 10 and issues the power OFF instruction, in principle, only when the relationship between the present time t at which a power OFF instruction is to be issued and the power ON reservation time T satisfies t<T, whereby the power supply is prevented from being turned OFF in the case where the present time t is after the power ON reservation time T and therefore the power supply should originally be turned ON by the power ON control unit. Further, when T≦t+c, that is, when the power ON reservation time T has reached to within the time c after the time t at which the condition of issuing a power OFF instruction has been satisfied, issuing of a power OFF instruction is prevented, whereby it is possible to improve the reliability of the hardware and prevent uncontrollable status of the power ON/OFF control in the instance where the power ON and OFF times are very close to each other. Furthermore, when there is a factor which causes a power OFF instruction to be issued, for example, when a hardware fault occurs which makes it impossible to carry on the operation of the system during the running of the same, no judgement in the above-described flow chart is made and a power OFF instruction is immediately issued, whereby it is possible to prevent the system malfunction from worsening.

It is to be noted that, although in the above-described embodiment the power ON control unit 30 is not controlled by the program, the arrangement may be defined such that power ON reservation time information is transferred to the power ON control unit 30 through the instruction unit 13 according to an instruction issued from the program, and the power ON control unit 30 control would thus control the power control circuit 16 such as to turn ON the power supply according to the transferred time information. In such a case, the operation of turning ON and OFF the power supply would thereby be controlled by the program.

Further, in the case where the power ON reservation time on the table 12 is held by a register means, the power ON reservation time held in the timer 32 incorporated in the power ON control unit 30 may be set by making reference to the power ON reservation time in the register means.

Figure 3:
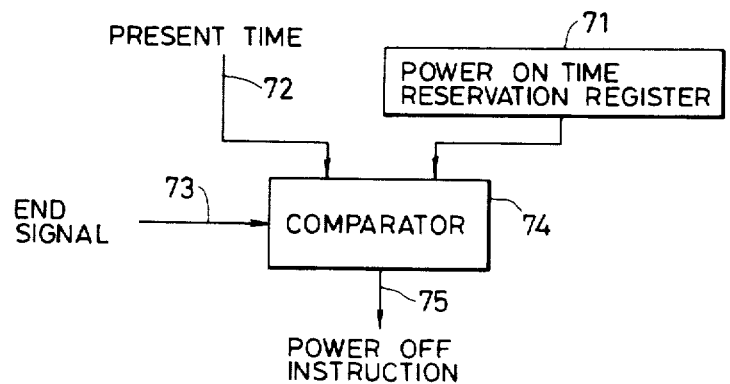
FIG. 3 is block diagram of another embodiment of the present invention.

FIG. 3 shows another embodiment of the present invention. The circuit shown in FIG. 3 is provided in the instruction unit 13. A register 71 holds the power ON reservation time. A comparator 74 is supplied through a line 73 with an end signal which represents the fact that the predetermined job stream has ended or was completed. When supplied with the end signal, the comparator 74 makes comparison between the present time given through line 72 from the time-of-day clock unit 15 and the power ON reservation time in the register 71. If the present time is before the power ON reservation time, the comparator 74 instructs the power OFF control unit 20 to turn OFF the power supply through a line 75. The comparator 74 may be adapted to make comparison between the power ON reservation time and T the time which is obtained by adding the predetermined time c, described in relation to FIG. 2, to the present time t. Further, the circuit shown in FIG. 3 may be installed in the power OFF control unit 20.

Furthermore, in the present invention, it is possible for the control process to take a route to step 61 of resetting the timer 32 as shown by the broken line in place of the route shown by the line 43. When a power OFF factor occurs which makes it impossible to carry on the operation of the system, such as a hardware fault, a timer reset instruction is issued, and the instruction unit 13 delivers a timer reset command to the timer 32, whereby the timer 32 is reset (step 61). Then, the power OFF instruction is issued, and the instruction unit 13 delivers a power OFF command to the power OFF control unit 20, thus causing the power OFF control unit 20 to actuate the power control circuit 16 such as to turn OFF the power supply of the system 10 (steps 51 and 52).

Thus, when a serious hardware fault occurs, the power supply of the system 10 is immediately turned OFF without condition, and the timer 32 is reset so as to prevent the power supply from being turned ON thereafter, whereby it is possible to prevent the trouble from spreading.

According to the present invention, when the power supply of the system is turned OFF, the next power ON reservation time is referred to. It is therefore possible for the system to be appropriately operated.

What is claimed is:

1. A power control method for controlling a power ON/OFF control means to timely switch ON and OFF a power supply of a data processing system carrying out data processing in accordance with a program stored in a memory, wherein at least one of said system and power ON/OFF control means include a timer means and said system further includes means for holding a power ON reservation time scheduled for respective job streams to be performed, said power control method comprsing the steps of:
   determining whether or not a particular job stream, scheduled to have begun earlier, has ended;
   if it is determined that said particular job stream has ended reading the present time from said timer means, corresponding to the time said particular job ends, and the power ON reservation time, corresponding to a next scheduled job stream, from said holding means;
   detecting whether or not said power ON reservation time, corresponding to the next scheduled job stream, has passed at the time when said particular job stream was determined as having ended; and
   deactivating said power supply by said power ON/OFF control means when the result of the detection is positive, indicating that said power ON reservation time has not passed, and continuing the active ON condition of said power supply of said system when the result of said detection is negative, indicating that said power ON reservation time has passed.

2. A power control method according to claim 1, wherein said detection step further comprises the steps of:
   checking whether or not said present time corresponds to an actual time prior to said power ON reservation time by a time period equal to or greater than a predetermined period of time, and
   maintaining said power supply active if the checking result is negative, and deactivating said power supply if the checking result is positive.

3. A power control method according to claim 1, further comprising the step of:
   executing the power OFF condition of said power supply if a specific condition of said system, referred to as a specific power OFF factor, makes it impossible to carry out said job stream during the processing of said job stream.

4. A power control method according to claim 3, further comprising the step of:
   resetting said timer means if said specific power OFF factor occurs during the processing of said job stream.

5. A power control method according to claim 3, wherein said power OFF factor includes a hardware fault condition in said system.

6. A power control method according to claim 4, wherein said power OFF factor includes a hardware fault condition in said system.

7. A power control method according to claim 1, wherein said power ON reservation time schedule is held in a register means.

8. A power control method for controlling a power ON/OFF control means to timely ON and OFF a power supply of a data processing system carrying out data processing in accordance with a program stored in a memory wherein at least one of said system and power ON/OFF control unit include a timer means and said system further includes means for holding a power ON reservation time schedule for respective job streams to be performed, said power control method comprising the steps of:
   determining whether or not a particular job stream, scheduled to have begun earlier, has ended;
   if it is determined that said particular job stream has ended reading the present time from said timer means, corresponding to the time said particular job ends, and the power ON reservation time, corresponding to a next scheduled job stream, from said holding means;
   detecting whether or not said present time corresponds to an actual time prior to said power ON reservation time by a time period equal to or greater than a predetermined period of time; and
   deactivating said power supply by said power ON/OFF control means when the result of said detection is positive, indicating that said present time is earlier than said power ON reservation time by at least said predetermined period of time, and maintaining said power supply active when the result of said detection is negative, indicating that said present time is not earlier than said power ON reservation time by at least said predetermined period of time.

9. A power control apparatus for controlling a power ON/OFF control means to timely switch ON and OFF a power supply of a data processing system carrying out data processing in accordance with a program stored in a memory, wherein at least one of said system and/or power ON/OFF control means include a timer means, said apparatus comprising:

means for holding a power ON reservation time schedule for respective job streams to be performed;

means for determining whether or not a particular job stream, scheduled to have begun earlier, has ended;

means for reading the present time from said timer means, if it is determined that said particular job stream has ended, and the power ON reservation time, corresponding to a next scheduled job stream, from said holding means;

means for detecting whether or not said power ON reservation time, corresponding to the next scheduled job stream, has passed at the time when said particular job stream was determined as having ended; and means for actuating said power ON/OFF control means to deactivate said power supply when the result of the detection is positive, indicating that said power ON reservation time has not passed, and continuing the active ON condition of said power supply of said system when the result of said detection is negative, indicating that said power ON reservation time has passed.

10. A power control apparatus according to claim 9, wherein said means for detecting comprising:

detection means for determing whether or not said present time corresponds to an actual time prior to said power ON reservation time by a time period equal to or greater than a predetermined period of time; and means for maintaining said power supply active if the result detected is negative, and deactivating said power supply if the result detected is positive.

11. In an apparatus, including a data processing system powered by a power supply, and carrying out data processing in accordance with a program stored in a memory, a power ON/OFF control means and wherein at least one of said data processing system and/or said power ON/OFF control means include a timer means, a power control method for timely switching ON and OFF said power supply by said power ON/OFF control means comprising the steps of:

holding a power ON reservation time schedule for respective job streams to be performed;

determining whether or not a particular job stream, scheduled to have begun earlier, has ended;

reading the present time from said timer means, including the time said particular job ends, and the power ON reservation time, corresponding to a next scheduled job stream, from said holding means;

detecting whether or not said power ON reservation time, corresponding to the next scheduled job stream, has passed at the time when said particular job stream was determined as having ended; and deactivating said power supply by said power ON/OFF control means when the result of the detection is positive, indicating that said power ON reservation time has not passed, and continuing the active ON condition of said power supply of said system when the result of said detection is negative, indicating that said power ON reservation time has passed.

12. A power control method according to claim 11, wherein said detection step further comprises the steps of:

checking whether or not said present time corresponds to an actual time prior to said power ON reservation time by a time period equal to or greater than a predetermined period of time, and maintaining said power supply active if the checking result is negative, and deactivating said power supply if the checking result is positive.

13. A power control method according to claim 11, further comprising the step of:

executing the power OFF condition of said power supply if a specific condition of said system, referred to as a specific power OFF factor, makes it impossible to carry out said job stream during the processing of said job stream.

14. A power control method according to claim 13, further comprising the step of:

resetting said timer means if said specific power OFF factor occurs during the processing of said job stream.

15. A power control method according to claim 13, wherein said power OFF factor includes a hardware fault condition in said system.

* * * * *